United States Patent [19]
Tsuchida

[11] Patent Number: 5,969,629
[45] Date of Patent: *Oct. 19, 1999

[54] WIRELESS COMMUNICATION APPARATUS

[75] Inventor: Shinji Tsuchida, Zama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/595,787

[22] Filed: Feb. 2, 1996

[30] Foreign Application Priority Data

Feb. 6, 1995 [JP] Japan ................................. 7-017839

[51] Int. Cl.$^6$ .................................................. G05B 23/02
[52] U.S. Cl. ...................... 340/825.06; 455/432; 455/450
[58] Field of Search ....................... 340/825.06; 370/331, 370/332; 455/54.2, 33.2, 34, 38.1, 38.2

[56] References Cited

U.S. PATENT DOCUMENTS

| | | |
|---|---|---|
| 4,597,104 | 6/1986 | Ohki et al. . |
| 4,718,081 | 1/1988 | Brenig . |
| 4,759,051 | 7/1988 | Han . |
| 4,965,849 | 10/1990 | Kunihiro . |
| 5,067,147 | 11/1991 | Lee . |
| 5,109,528 | 4/1992 | Uddenfeldt . |
| 5,157,709 | 10/1992 | Ohteru . |
| 5,197,093 | 3/1993 | Knuth et al. . |
| 5,243,598 | 9/1993 | Lee . |
| 5,276,680 | 1/1994 | Messenger .............................. 370/38.3 |

FOREIGN PATENT DOCUMENTS

| | | |
|---|---|---|
| 59-28733 | 2/1984 | Japan . |
| 6331232 | 7/1986 | Japan . |
| 4239850 | 8/1992 | Japan . |

*Primary Examiner*—Michael Horabik
*Assistant Examiner*—Anthony A. Asongwed
*Attorney, Agent, or Firm*—Morgan & Finnegan, LLP

[57] ABSTRACT

A wireless communication apparatus automatically disconnects a communication channel between a master device and a slave device when a received electric field intensity becomes lower than a predetermined level, thereby preventing unnecessarily prolonged communication when the field intensity is excessively low. The received field intensity is detected and if in the course of communication, the reception field intensity becomes lower than a reference level a request for confirmation of the communication status is transmitted to the slave device. In accordance with the response from the slave device to the request for confirmation, the wireless channel may be disconnected.

17 Claims, 19 Drawing Sheets

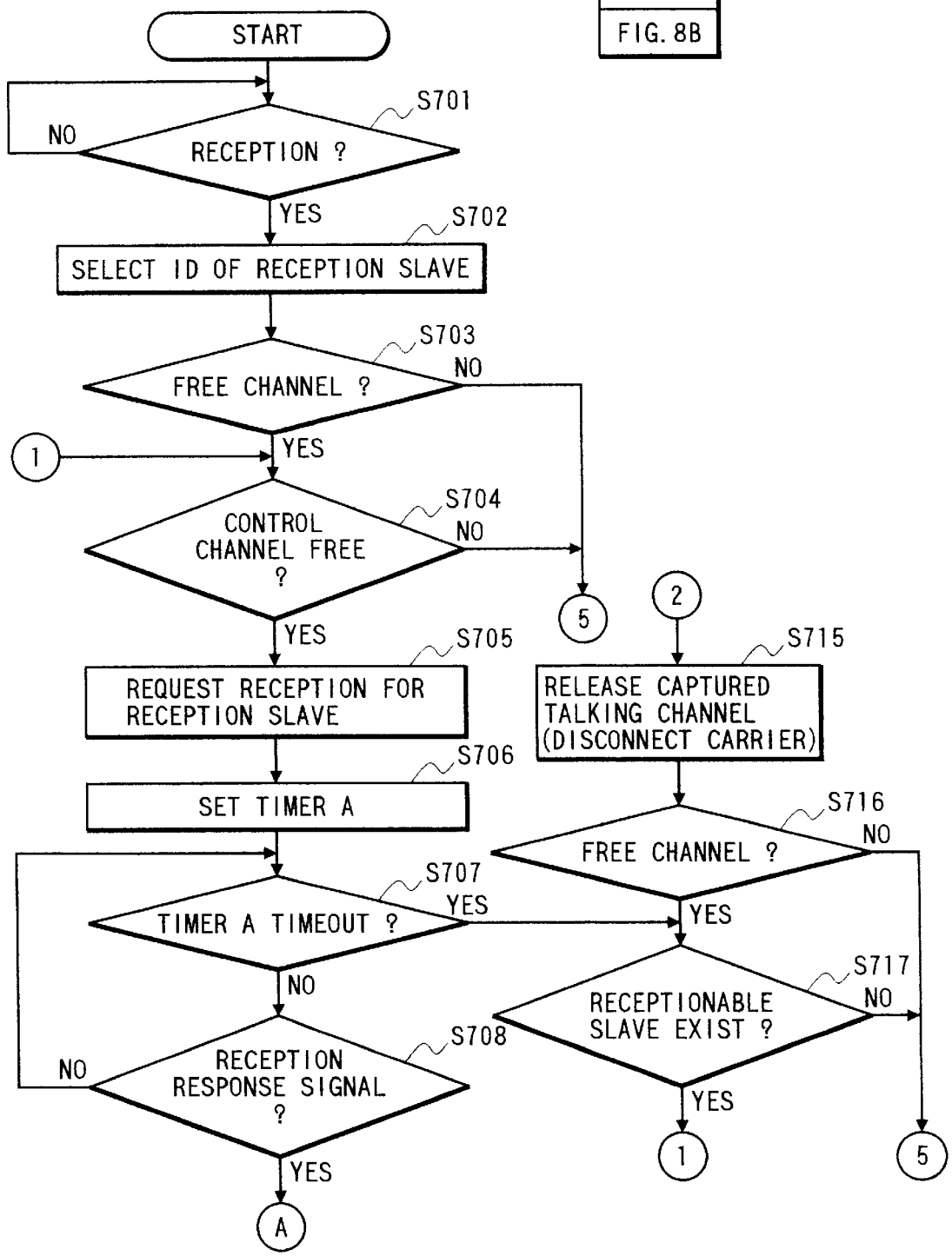

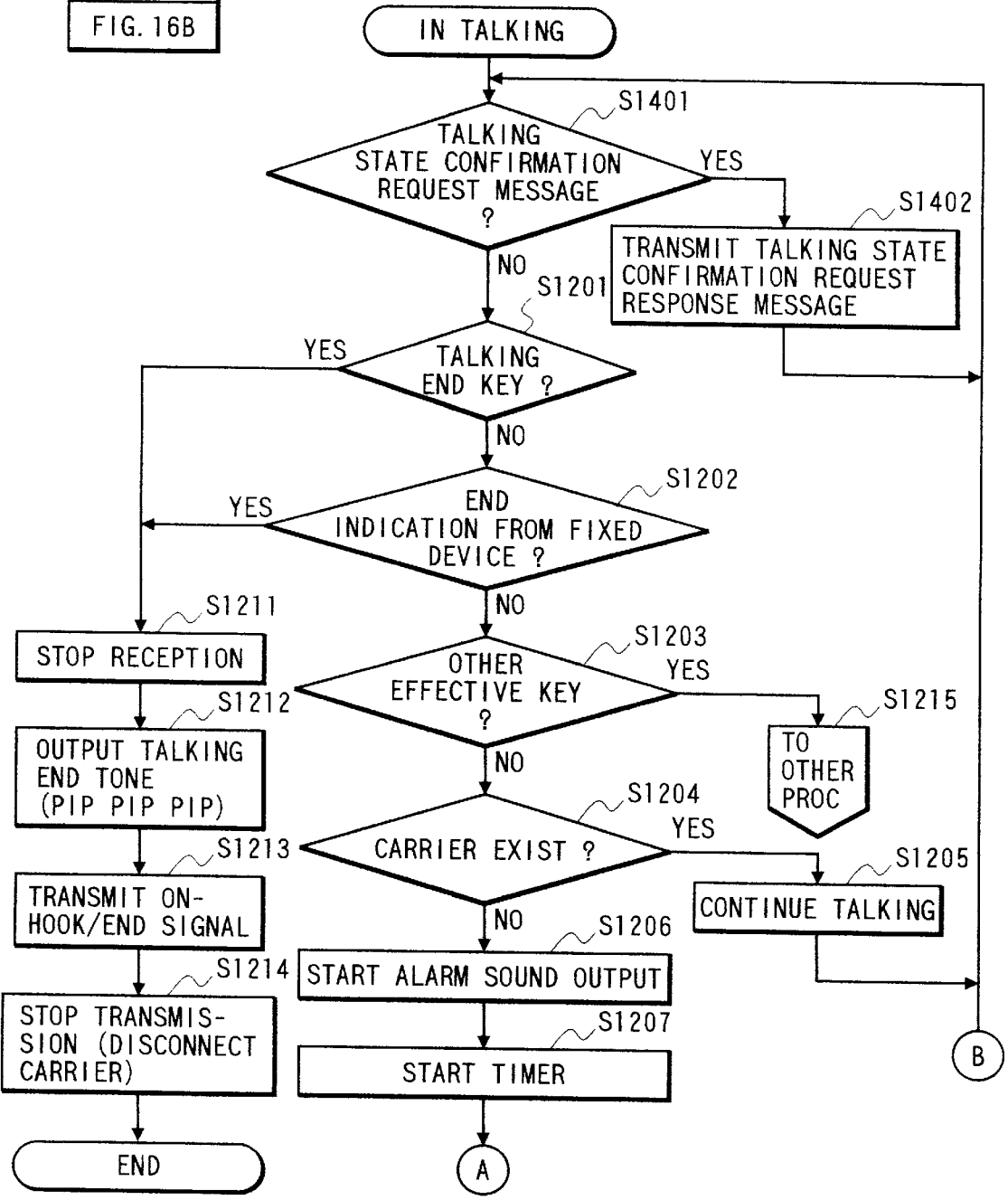

WIRELESS COMMUNICATION APPARATUS

BACKGROUND OF THE INVENTION

1. Field of the Invention

The present invention relates to a wireless communication apparatus.

2. Related Background Art

There is conventionally known a wireless communication apparatus which is so constructed as to terminate the transmission of the radio wave, judging that the communication is terminated by the partner or communication, in case the received radio wave becomes very weak.

However such conventional wireless communication apparatus may continue the communication even after the communication is terminated by the partner of communication, misunderstanding the noises from nearby equipment or the like as the radio wave from the partner of communication.

SUMMARY OF THE INVENTION

An object of the present invention is to avoid the drawback that a new communication is inhibited by noises.

Another object of the present invention is to prevent generation of noise by confirmation, if the reception is made with a high electric field intensity distinguishable from the noises.

Still another object of the present invention is to immediately disconnect the communication channel when the received radio wave becomes very weak, thereby preparing for a next communication.

Still another object of the present invention is to effect communication with a weak radio wave and to disconnect the communication channel when the communication is terminated.

Still another object of the present invention is to render selectable whether or not to effect confirmation of the communication status and the frequency of such confirmation according for example to ambient conditions, since the confirmation of the communication status generates noise in the communication under execution.

Still another object of the present invention is to disconnect the wireless channel, in case the status cannot be confirmed for example by the noise.

Still another object of the present invention is, in case the communication status is bad, to inform the user that the channel is to be disconnected soon because of the bad communication status and to advise the user to move to a location of better communication status.

Still another object of the present invention is to continue the communication in case the communication status is improved by the movement of the user.

Still another object of the present invention is to effect stable operation in case deterioration and subsequent improvement of the communication status are repeated frequently.

Still another object of the present invention is to provide a wireless communication apparatus provided with means for transmitting a request for confirmation, in the form of a wireless signal, when the received electric field intensity becomes lower than a reference in the course of communication, and means for disconnecting the channel according to a response to the above-mentioned request for confirmation.

Still other objects of the present invention, and the features thereof, will become fully apparent from the following description of the embodiments, to be taken in conjunction with the attached drawings.

DETAILED DESCRIPTION OF THE PREFERRED EMBODIMENTS

Now the present invention will be clarified in detail by preferred embodiments thereof shown in the attached drawings.

Figure 1:
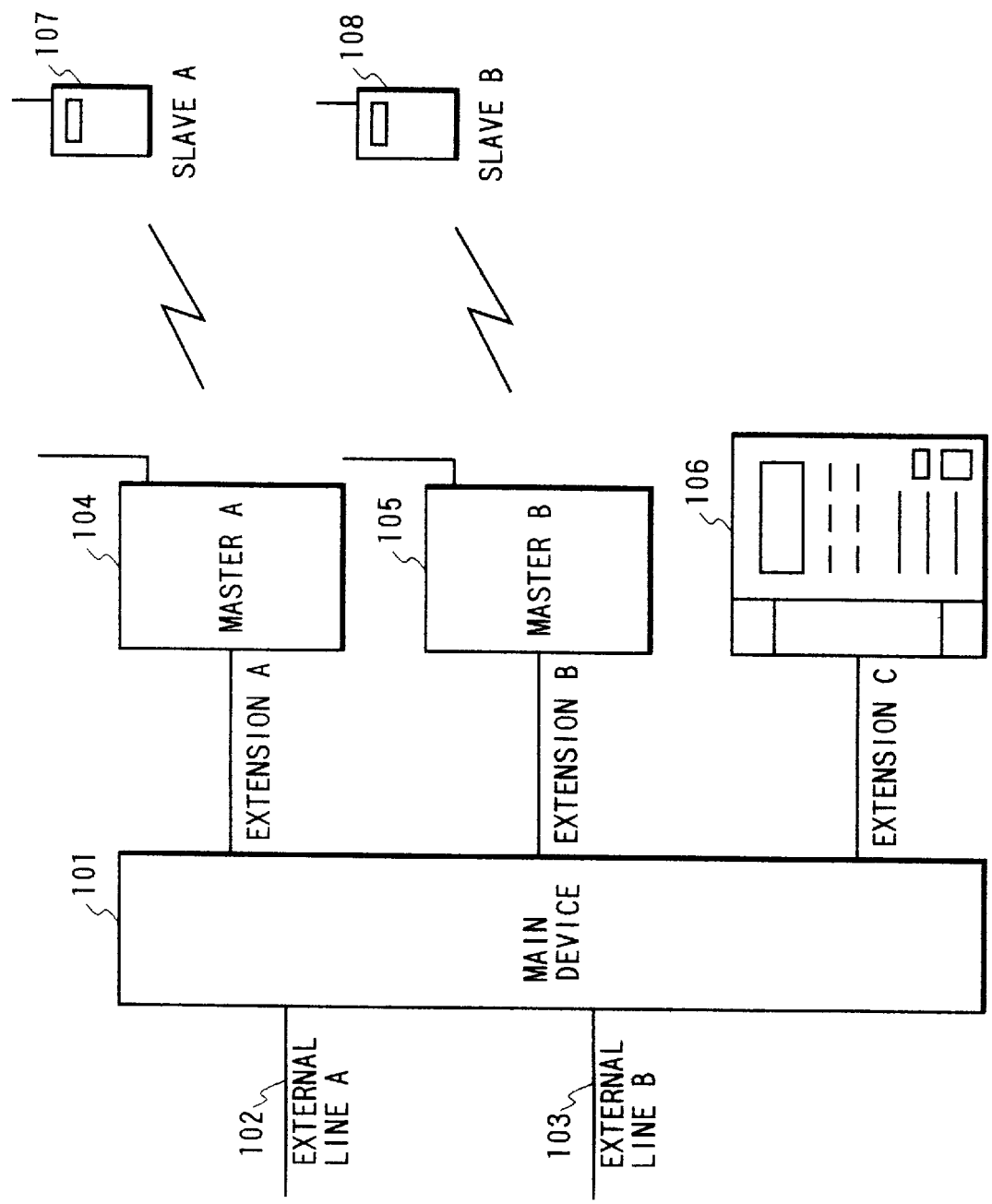
FIG. 1 is a view showing the configuration of an exchange system.

FIG. 1 is a block diagram of an exchange system including a wireless communication apparatus embodying the present invention. It is to be noted, however, that the present invention is applicable not only to a wireless communication apparatus included in an internal line of an exchange system but also to a wireless communication apparatus connected directly to an external line. It is also applicable to a wireless station for relaying the communication among plural movable devices.

In FIG. 1:

101 indicates a main device with exchange function for at least an external line and at least an internal line;

102, 103 are external lines to other subscribers;

104, 105 are master devices incorporated in the main device 101;

106 is a wire-exclusive telephone unit incorporated in the main device 101; and

107, 108 are slave devices connected with the master devices 104, 105 through wireless channels.

The slave device 107 is connected with the master device 104 through a wireless channel and is capable, through the main device 101, of communicating with the wire-exclusive telephone unit 106 and of sending and receiving a call to or from the external lines 102, 103.

Figure 2:
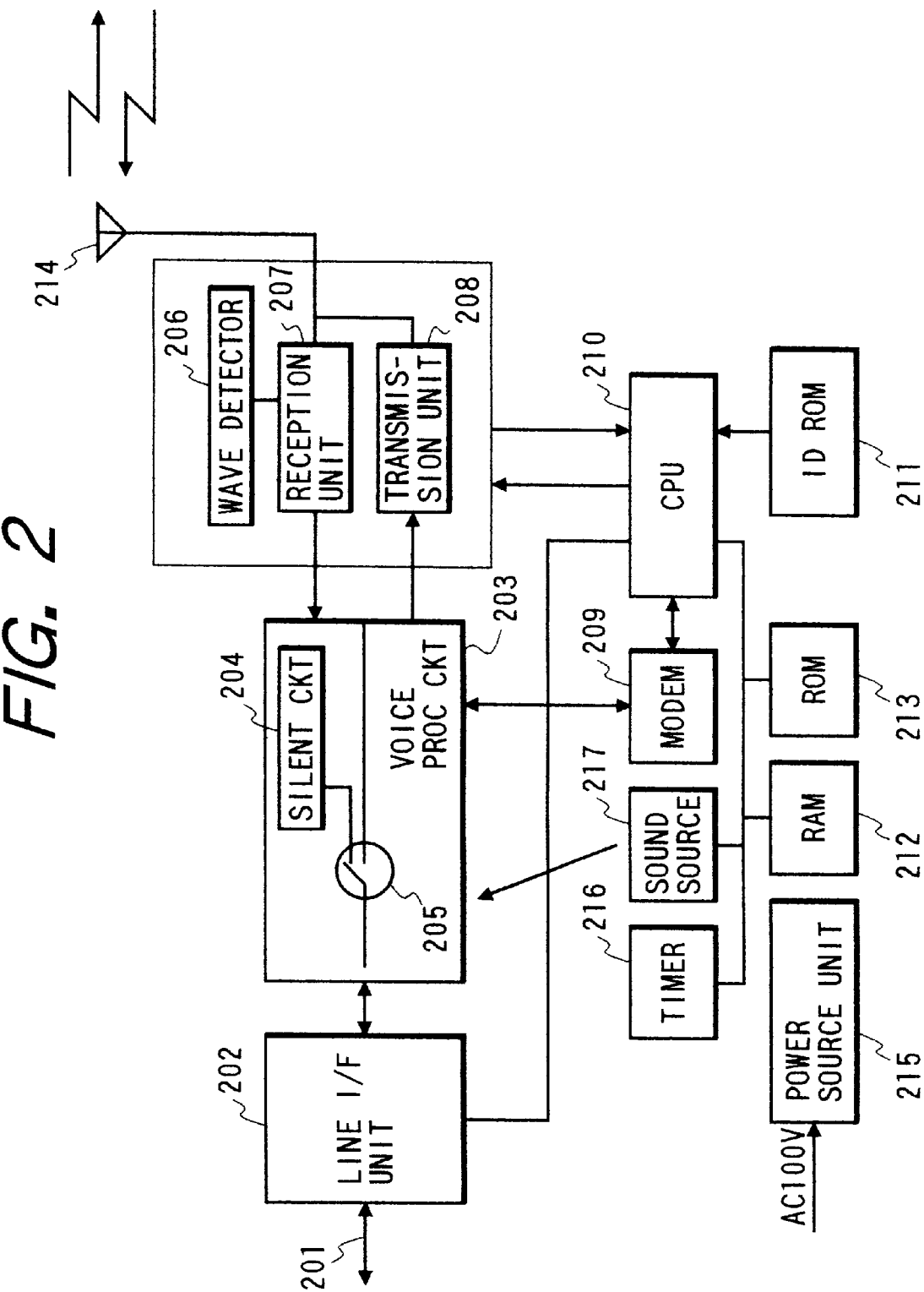
FIG. 2 is a block diagram of a master device embodying the present invention.

FIG. 2 is a block diagram showing the internal structure of the master devices 104, 105.

In FIG. 2:

201 is a cable connecting the master device with the main device 101;

202 is a line interface unit for transmitting control signals and voice signals between the main device 101 and the master device;

203 is a voice process circuit for transmitting and receiving the voice signals through a wireless channel;

204 is a silent circuit for generating a silent state;

205 is a switch for selecting the voice signal from the slave device or the silent signal generated in the silent circuit 204, for transmission to the main device 101;

206 is a wave detector for detecting the intensity of a radio wave transmitted from the slave device;

207 is a reception circuit for receiving the radio wave from the slave device;

208 is a transmission circuit for transmitting a radio wave to the slave device;

209 is a modem for transmitting or receiving control data to or from the slave device;

210 is a CPU functioning by a program stored in a ROM 213;

211 is an IDROM storing ID codes for confirming the combination of the master device and the slave device in communication;

212 is a RAM in which the CPU 210 stores variable data according to the program stored in the ROM 213;

213 is a ROM storing the program for the CPU 210;

214 is an antenna for improving the efficiency of transmission and reception of the wireless signal;

215 is a power source unit for supplying various units with a power supply voltage;

216 is a timer for managing time in communication with the slave device or in sounding an alarm; and

217 is a sound source for generating an alarm or the like.

The master device is controlled by the CPU 210, and the voice signal from the main device 101 is transmitted, through the line interface unit 202, the voice process circuit 203 and the transmission circuit 208, to the slave device. Also the voice signal from the slave device is transmitted, through the reception circuit 207, the voice process circuit 203 and the line interface unit 202, to the main device 101. The control data are transmitted and received between the master device and the slave device, through the CPU 210, the modem 209 and the voice process circuit 202. The alarm sound from the sound source 217 is transmitted through the voice process circuit 203 and the transmission circuit 208 to the slave device.

Figure 3:
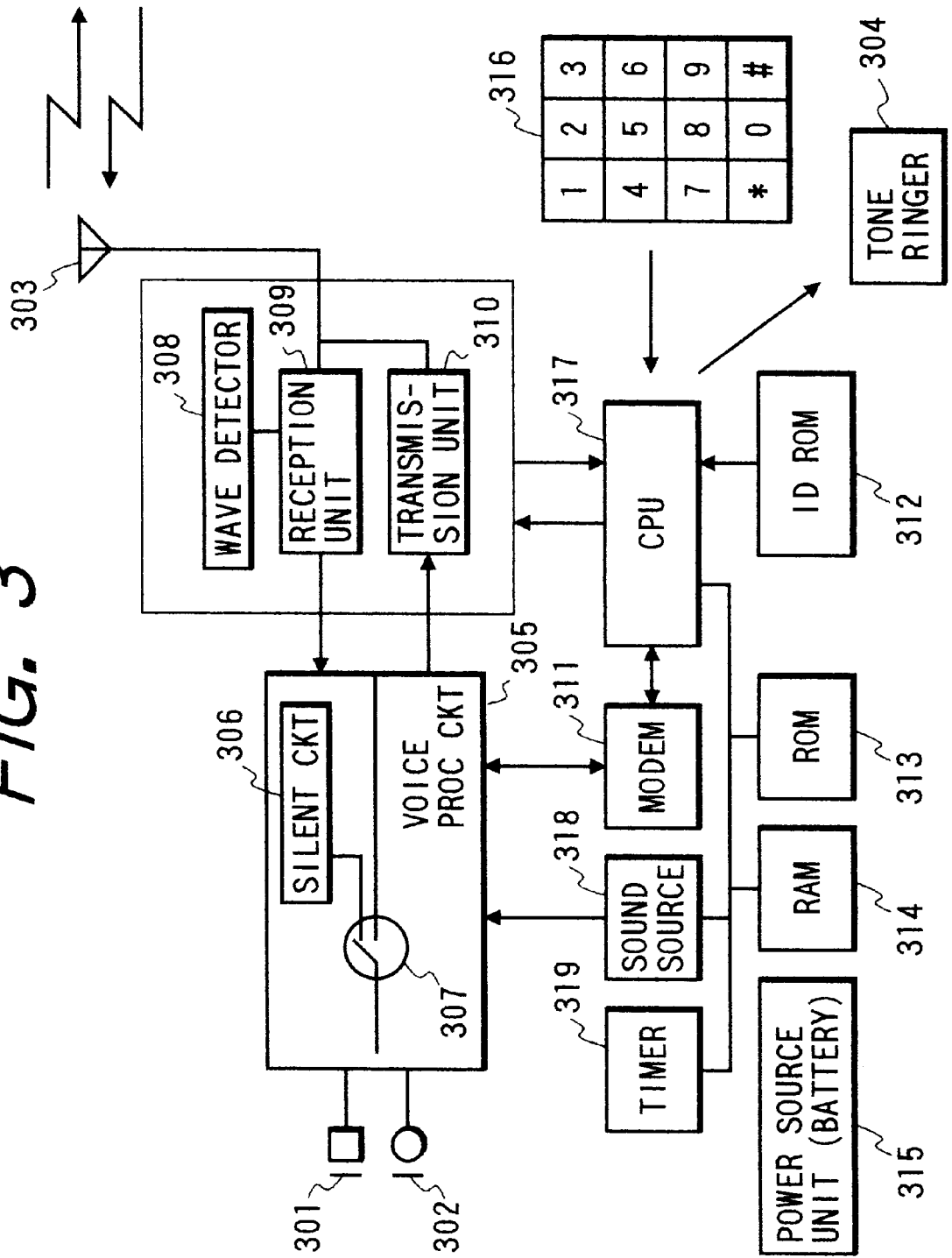
FIG. 3 is a block diagram of a slave device.

FIG. 3 is a block diagram showing the internal structure of the slave devices 107, 108 shown in FIG. 1.

In FIG. 3:

301 is a microphone for voice input;

302 is a loud-speaker for voice output;

303 is an antenna for improving the efficiency of transmission and reception of the wireless signal;

304 is a tone ringer for generating a call reception sound when a call is received by the slave device;

305 is a voice process circuit for transmitting and receiving the voice signal through a wireless channel;

306 is a silent circuit for generating a silent state;

307 is a switch for selecting the voice signal from the master device or the silent signal generated by the silent circuit 306;

308 is a wave detector for detecting the intensity of a radio wave transmitted from the master device;

309 is a reception circuit for receiving the radio wave from the master device;

310 is a transmission circuit for transmitting a radio wave to the master device;

311 is a modem for transmitting or receiving control data to or from the master device;

312 is an IDROM storing ID codes for confirming the combination of the master device and the slave device in communication;

313 is a ROM storing the program for a CPU 317;

314 is a RAM in which the CPU 317 stores variable data according to the program stored in the ROM 313;

315 is a power source unit for supplying various units with a power supply voltage;

316 is a keypad containing dial keys etc. for the transmitting and receiving operations in the slave device;

317 is a CPU functioning by a program stored in the ROM 313;

318 is a sound source for generating an alarm or the like; and

319 is a timer for managing time in communication with the master device or in sounding an alarm.

The slave device is controlled by the CPU 317, and the voice signal from the user is transmitted, through the microphone 301, the voice process circuit 305 and the transmission circuit 310, to the master device. Also the voice signal from the master device reaches the user through the reception circuit 309, the voice process circuit 305 and the loudspeaker 302. The control data are transmitted and received between the master device and the slave device, through the CPU 317, the modem 311 and the voice process circuit 305. Also the alarm sound from the sound source 318 reaches the user through the voice process circuit 305 and the loudspeaker 302.

Figure 4:
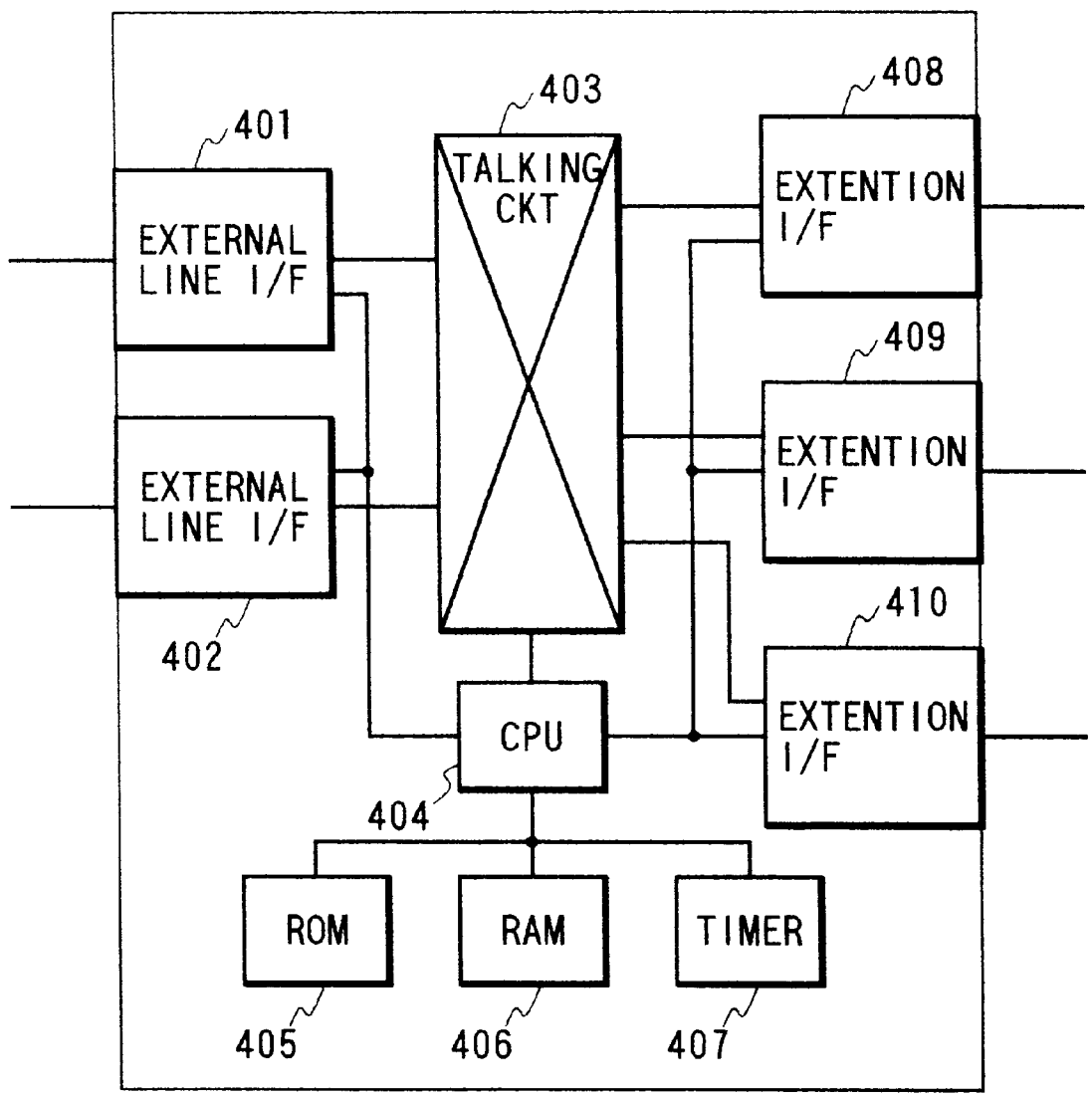
FIG. 4 is a block diagram of a master device.

FIG. 4 is a block diagram of the main device 101 in FIG. 1.

In FIG. 4:

401, 402 are external line interface circuits for connection with external lines;

403 is a talk circuit for connection between external and internal lines or between internal lines;

404 is a CPU functioning by a program stored in a ROM 405, for controlling the entire main device;

405 is a ROM storing the program for the CPU 404;

406 is a RAM in which the CPU 404 stores data necessary for controlling the main device;

407 is a timer, used by the CPU 404 in the control of the main device, for time management for example in the control data communication with internal/external line interfaces; and

408, 409, 410 are internal line interfaces for connection with internal line terminals such as a cordless telephone unit or a wire-exclusive telephone unit.

When the power supply is turned on in the main device, the internal/external line interfaces inform the CPU 404 of the respective specifications and the respectively connected devices, and the CPU 404 stores thus informed data in the RAM 406 and effects the control matching the kinds of the interfaces and the connected terminals.

Figure 5:
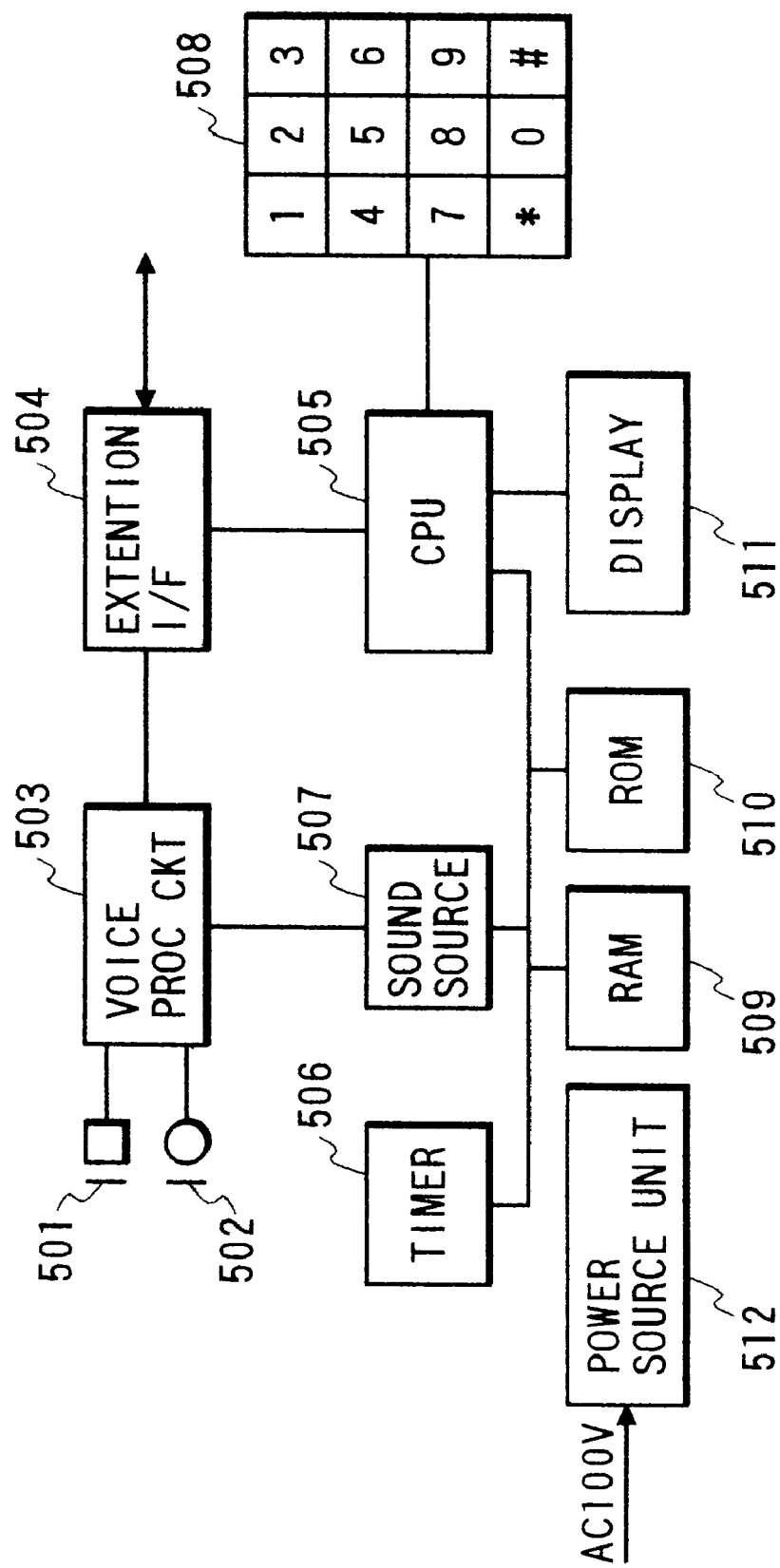
FIG. 5 is a block diagram of a wired-exclusive telephone set.

FIG. 5 is a block diagram of the wire-exclusive telephone unit shown in FIG. 1.

In FIG. 5:

501 is a microphone for entering the voice signal of the user;

502 is a loudspeaker for releasing the voice signal;

503 is a voice process circuit effecting A/D or D/A conversion;

504 is an internal line interface for communicating with the internal line interface of the main device 111;

505 is a CPU controlling the entire wire-exclusive telephone unit;

506 is a timer used by the CPU 505 for the time management required in the control of the wire-exclusive telephone unit;

507 is a sound source for generating a sound for improving the operability by the user;

508 is a keypad for effecting transmitting and receiving operations;

509 is a RAM for storing data required for controlling the entire wire-exclusive telephone unit;

510 is a ROM storing a program used by the CPU 505 for controlling the wire-exclusive telephone unit;

511 is a display device for displaying the status of the wire-exclusive telephone unit or the current time, thereby improving the operability; and

512 is a power source for supplying the electric components, constituting the wire-exclusive telephone unit, with a power supply voltage.

The above-explained wire-exclusive telephone unit is capable not only of telephone communication but also, by keypad operations, of entry and setting of data required for the system, for example the carrier sense level of a cordless telephone unit.

In the following there will be explained a process of communication between the master device and the slave device in the present embodiment.

The wireless channel of the present embodiment consists of a control channel and a talk channel. At first the call generation and reception control is conducted between the master and slave devices, utilizing the control channel, and, in the course of such control, the talk channel to be used in the conversation is determined.

After the system is set up as shown in FIG. 1, at first the carrier sense level of the master devices 104, 105 is set by a key operation in the wire-exclusive telephone unit 106. The carrier sensing level mentioned above is used as a reference level, and the radio wave is identified as absent (not received) if the received electric field intensity is lower than this reference level. The call code, used for managing the combination of the master and slave devices, is stored in advance in the respective IDROM's. When the carrier sensing level is entered from the line-exclusive telephone unit, the data of the sensing level are read by the CPU 505, then transferred to the main device 101 through the internal line interfaces 504, 410, read again by the CPU 404 of the main device 101, transferred to the master devices 104, 105 through the internal line interfaces 408, 409 and received by the CPU 210 of the master device, which stores these data of the carrier sensing level in the RAM 212. The master devices 104, 105 may be given mutually different carrier sensing levels, or may be provided with keyboards for entering these data.

Also the carrier sensing level of the slave device is entered by the keypad 316 thereof and is stored in the RAM 314.

Also in the same manner as the data of the carrier sensing level, a reception field intensity for starting the request for confirmation of the communication status between the master and slave devices and a reception field intensity for terminating the request for confirmation of the communication status are entered from the line-exclusive telephone unit 106 and stored in the master devices. The master devices 104, 105 may be provided with keyboards for entering these data. It is also possible to set, from the line-exclusive telephone unit 106 etc., whether or not to request the confirmation of the communication status.

The system of the present embodiment becomes operable when these settings are completed.

In the following there will be explained, with reference to FIG. 6, the procedure of talking channel connection in case a call is generated from a slave device of the present embodiment. When the CPU 317 of the slave device receives a request for the talk channel connection generated by the operation on the keypad 316 (S601), the slave device searches an empty channel in the reception frequency band (S602). Then, after confirming that the control channel is empty (S603), it transmits, in the empty control channel, a call signal together with the data of the empty talk channel (S604). If the control channel is occupied, there is provided a notice that the connection is impossible (S612). An ID code is included in the call signal.

Then the slave device monitors whether a call response signal is transmitted from the master device (S605), and, if the call response signal is not received within a predetermined time, it again searches an empty channel or informs the user that the connection is impossible (S611). If the slave device receives the call response signal from the master device, it confirms whether the ID included in the call signal is same as that received in the call response signal (S606). If the ID's are identified as not same, it again searches an empty channel or informs the user that the connection is impossible (S611).

After confirmation of the ID in this manner, the slave device shifts from the control channel to the talk channel (S607). The slave device transmits a channel switch completion signal to the master device, utilizing the talk channel (S608), and monitors a response signal from the master device (S609). In case of absence of the response signal, it judges that the carrier is disconnected and tries the transmission again or informs that the connection is impossible (S613). In response to the reception of the response signal from the master device, the slave device turns on the voice process circuit, thereby enabling output of the voice from the master device through the loudspeaker 302 (S610). Then the talk channel is connected between the master and slave devices whereby the talking is made possible (S620).

Figure 7:
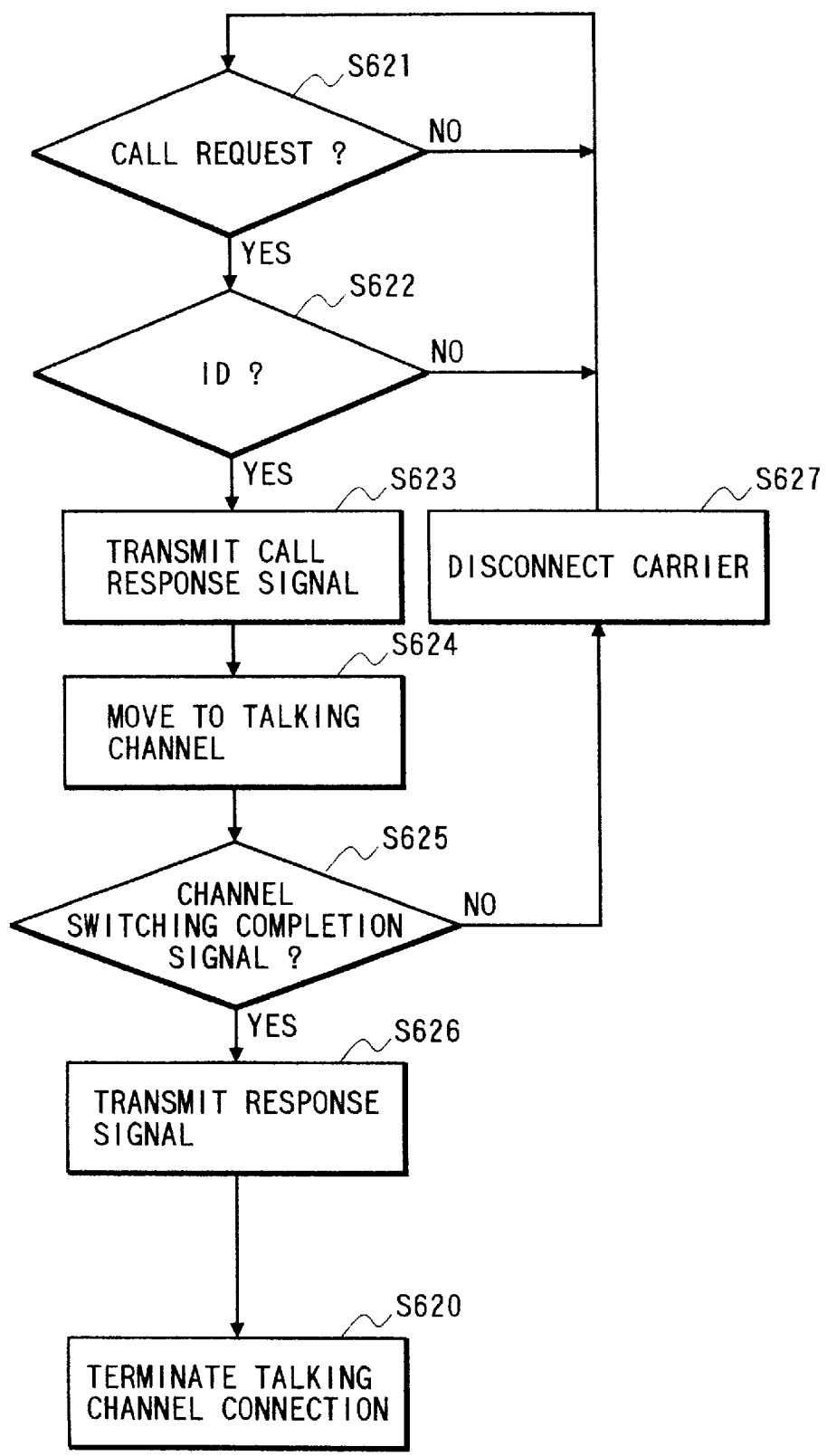
FIG. 7 is a flow chart of a call generation sequence (master device)
Figure 8B:
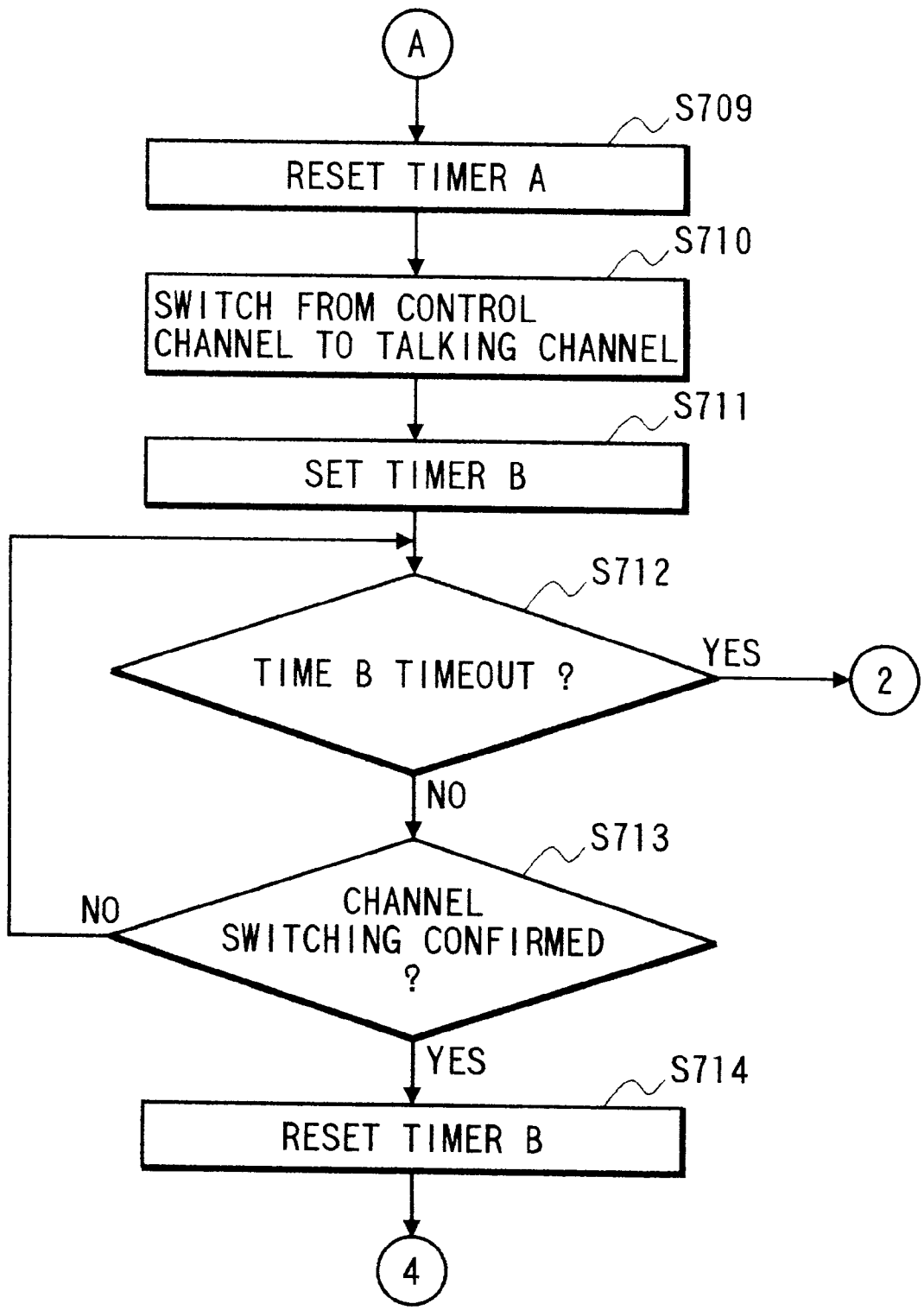
FIG. 8 which is composed of FIGS. 8A and 8B is a flow chart of a call reception sequence (master device)

In the following there will be explained, with reference to FIG. 7, the procedure for talk channel connection in the master device, in case a call is generated from a slave device. The master device monitors, on the control channel, whether a call request comes from the slave device (S621), and, upon reception of the call request, discriminates whether the ID sent in the call signal is correct (S622). If correct, it transmits a call response signal to the slave device through the control channel (S623). If the ID is incorrect or if the channel (control channel or empty talk channel included in the call signal) is occupied, it returns to the state of control channel monitoring (S622).

After transmission of the call response signal, the master device shifts from the control channel to the talk channel (S624) and monitors whether a channel switch completion signal is received from the slave device (S625). If the completion signal is received, the master device transmits a response signal (S626), but, if the completion signal is not received, the master device judges that the carrier is disconnected (S627) and returns to the state of control channel monitoring. At the transmission of the response signal, the talk channel is connected between the master and slave devices, whereby the talking is made possible (S620).

In the following there will be explained a reception procedure, with reference to FIGS. 8A to 11. When a call is received from an external line (S701), the master device 101 (FIG. 1) selects a receiving slave device (S702) and causes a master device to receive the call in order to receive the call by the above-mentioned slave device. Upon receiving the call, the master device searches an empty channel in the reception frequency band (S703). In the presence of an empty channel, it confirms that the control channel is empty (S704), and then transmits, in the fetched control channel, a call reception signal together with data designating the empty talk channel and data designating a slave device to be rung (S705). The call reception signal includes an ID.

Then the master device sets the timer and monitors a call reception response signal from the slave device (S706 to S708). If the call reception response signal is received from the slave device, the master device resets the timer (S709) and shifts, for both transmission and reception, from the control channel to the talk channel (S710). Then it sets another timer and monitors a channel switch completion signal from the slave device (S711 to S713). Upon receiving the channel switch completion signal from the slave device, the master device transmits, to the slave device, a ring control signal according to the reception mode and the slave device to be rung (S901).

Figure 10:
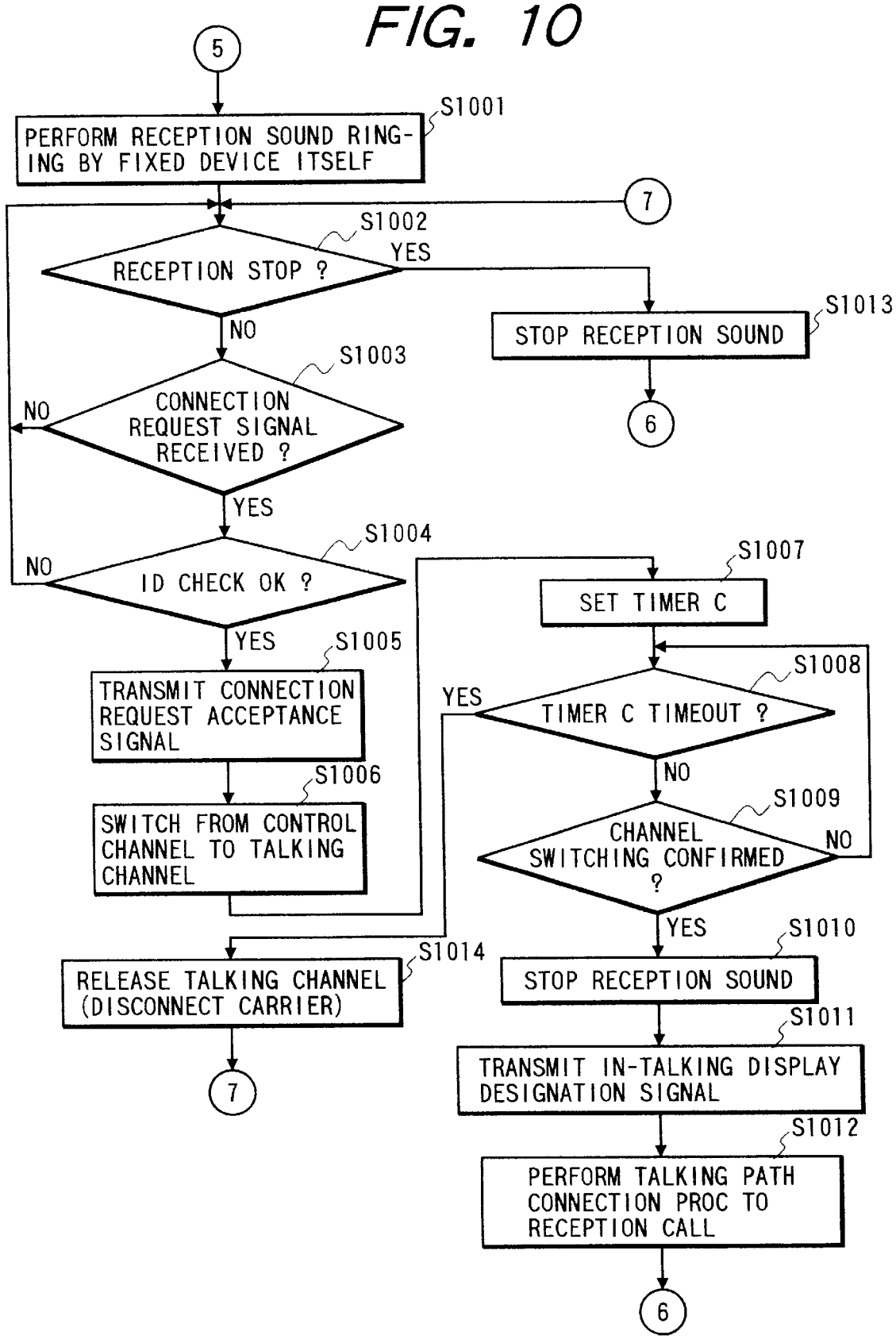
FIG. 10 is a flow chart of a master device ringing sequence (master device)

In the following there will be explained, with reference to FIGS. 8A ane 8B, a procedure in case the master device cannot receive the response signal from the slave device. At first there will be explained a case in which the channel switch completion signal cannot be received from the slave device in the step S712. In this case the carrier is judged as disconnected in the fetched talk channel (S715). Then there is discriminated whether a free channel is available, other than the channel designated previously for this call reception (S716). If a free channel is available, there is discriminated whether another slave device is available for call reception (S717). If a free channel is present and a slave device capable of call reception is present, the call reception is requested again to such slave device. If the free channel is not available or if the slave device capable of call reception is not available, there is executed a reception sound ringing procedure, to be explained later, in the master device (FIG. 10).

In case the call reception response signal cannot be received from the slave device in the step S707, there is discriminated whether another slave device capable of call reception is available (S717). If present, a call reception request signal is transmitted to such slave device, but, if absent, there is executed a reception sound ringing procedure, to be explained later, in the master device (FIG. 10).

Figure 11:
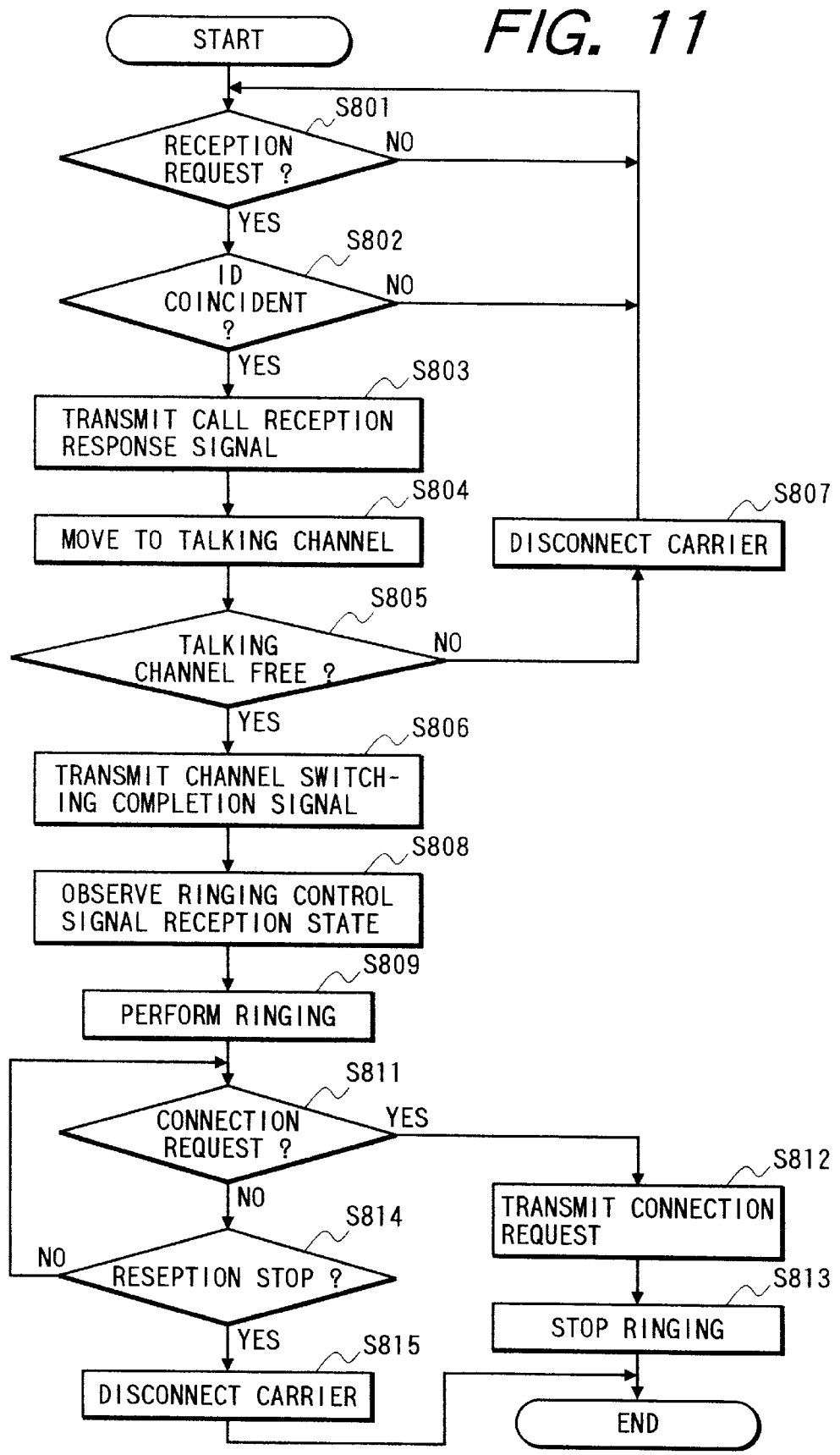
FIG. 11 is a flow chart of a call reception sequence (slave device)

In the following there will be explained the talk channel setting at the call reception in the slave device, with reference to FIG. 11. The slave device monitors a call reception signal from the master device (S801), and, upon reception of the call reception signal, discriminates whether the ID in the received signal coincides with the ID of the slave device (S802). In case of non-coincidence, it returns to the stand-by state. In case of coincidence, it transmits a call reception response signal (S803). It then switches the reception and transmission frequencies from the control channel to the talk channel (S804) and checks whether the talk channel is free (S805). If free, it transmits a channel switch completion signal (S806). If not free, it disconnects the carrier and returns to the stand-by state (S807). After the transmission of the channel switch completion signal, it monitors a ring control signal from the master device (S808).

Figure 9:
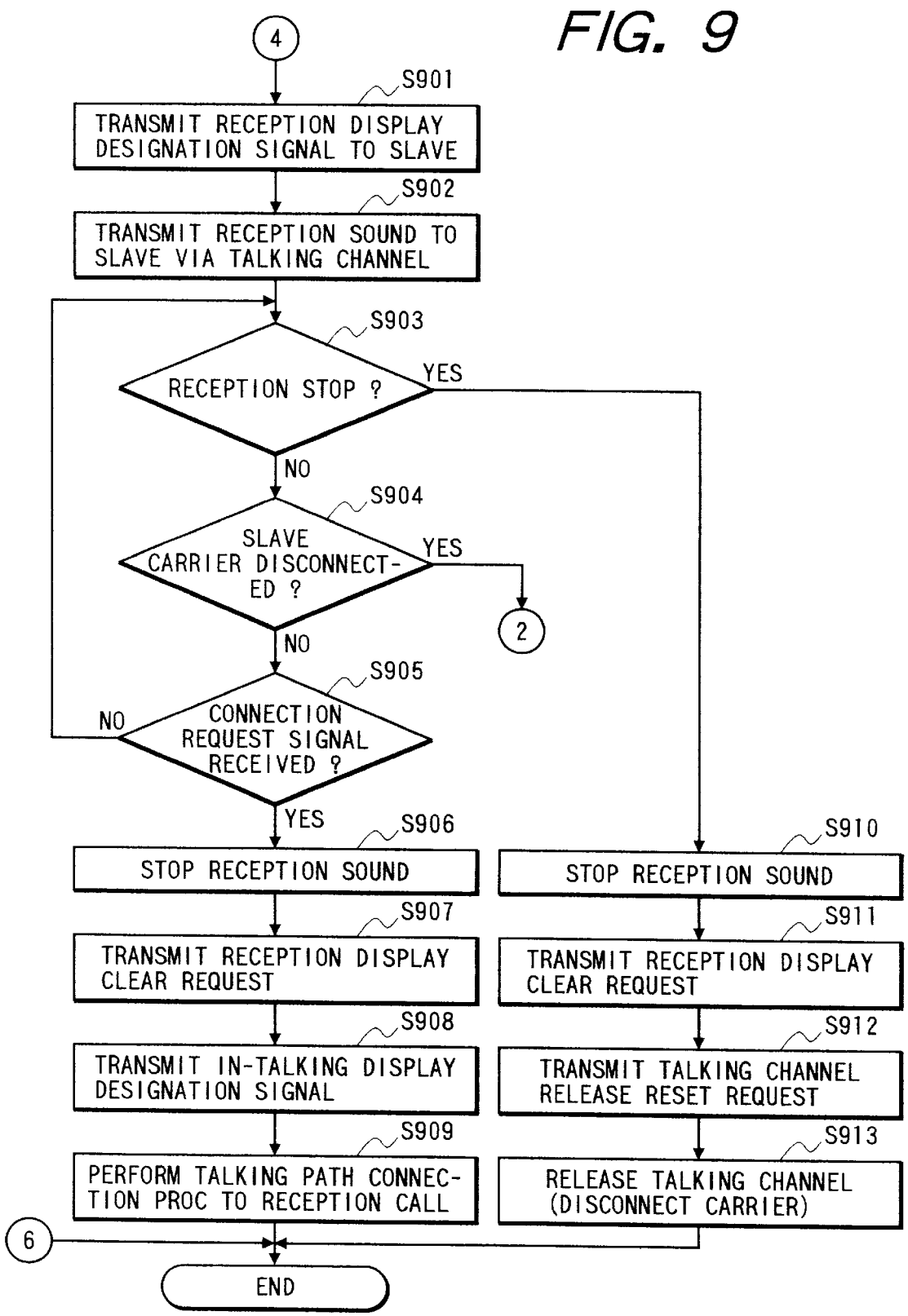
FIG. 9 is a flow chart of a call reception sequence (slave device)

In the following there will be explained a procedure for ringing the slave device, with reference to FIG. 9. After the connection of the talk channel by the talk channel connecting procedure (FIGS. 8A and 8B) in the master device and the talk channel setting procedure (FIG. 11) in the slave device, the master device transmits a call reception display designation signal according to the reception mode to the movable device through the talk channel (S901) and a call reception sound according to the reception mode to the slave device through the talk channel (S902) thereby ringing the slave device (S809 in FIG. 11) until the ringing from the external line (FIG. 1) is terminated (S903) or until the carrier from the slave device is disconnected (S904) or until a connection request is received from the slave device (S905).

If the call reception is terminated (S903), the master device sends a call reception ringing termination command to the slave device (S910), then transmits a request to clear the call reception display (S911), requests that the slave device terminates the carrier of the transmission channel (S912), also terminates the transmission of the carrier of the master device and terminates the sequence (S913). If the connection request is received from the slave device, the master device sends a call reception ringing termination command to the slave device (S906), then transmits a request for clearing the call reception display (S907), also transmits a busy display designation signal (S908), terminates the ringing of the slave device, and turns on the voice process circuit thereof and that of the master device (S909).

On the other hand, in response to a call reception response operation executed on the slave device during the ringing thereof, the CPU 317 receives a connection request (S811) and transmits a connection request signal (S812). In response a call reception ringing termination command is received from the master device, whereby the ringing of the slave device is terminated (S813).

In the following there will be explained, with reference to FIG. 10, a call reception ringing procedure in the master device. In case a free channel is not available in the step S703 in FIG. 8A, the sequence proceeds to a step S1001 in FIG. 10 to effect call reception ringing in the master device itself. If the call reception is terminated (S1002), the call reception ringing is terminated (S1003). If a connection request signal is received from the slave device in this state (S1003), there is executed a procedure for connecting a wireless channel between the master and slave devices. More specifically, the master device checks the ID included in the connection request signal (S1004), and, if it is correct, the master device transmits a connection request signal to the slave device (S1005) and switches to the control channel (S1006). It then sets the timer (S1007) and monitors a channel switch completion signal from the slave device (S1008, S1009). If the channel switch completion signal is not received, it releases the talk channel (S1014). If the channel switch completion signal is received, the master device terminates the call reception sound thereof (S1010), transmits a busy display signal to the slave device (S1011) and effects connection of the talk channel with the received call (S1012).

Figure 6:
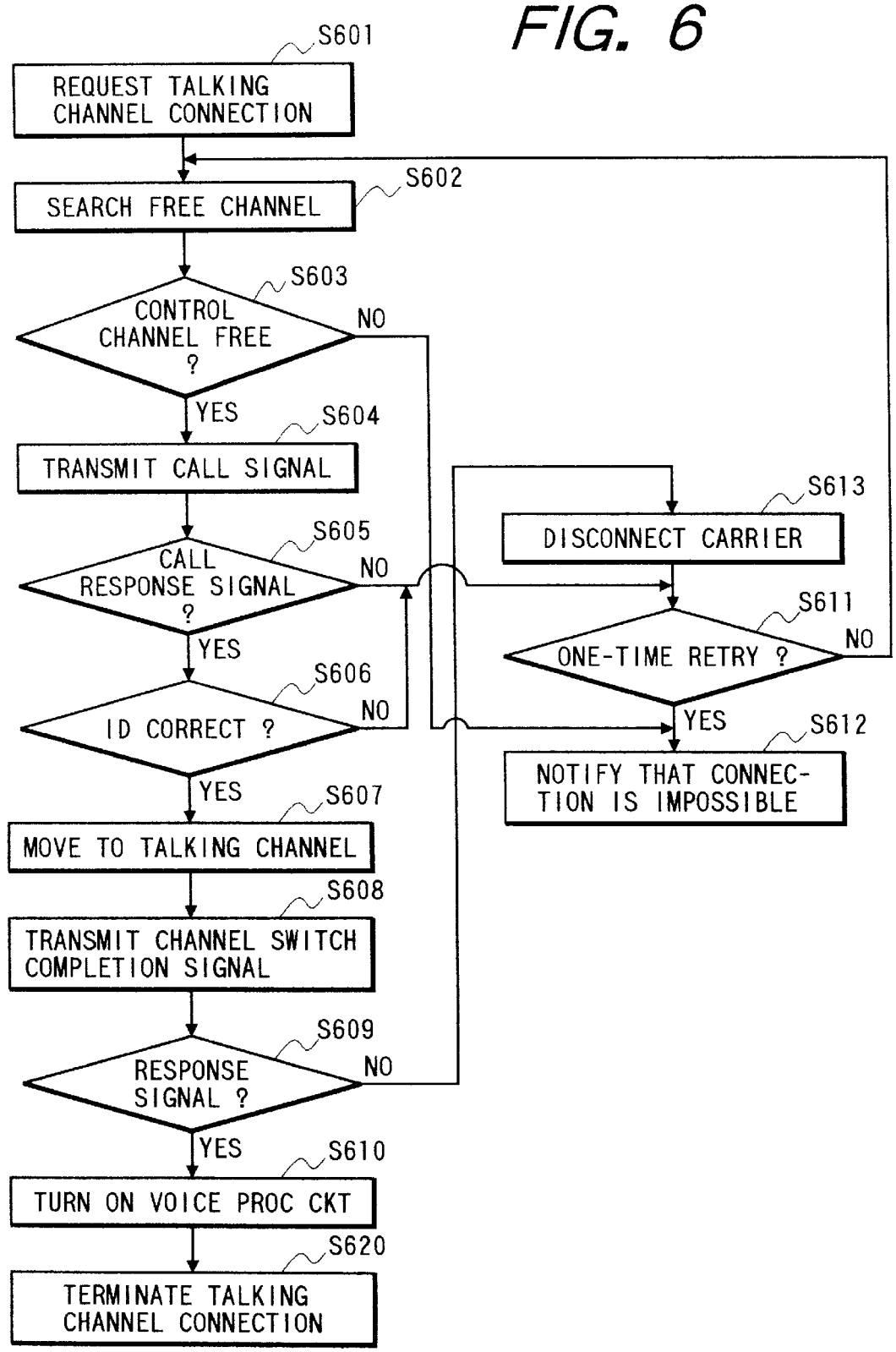
FIG. 6 is a flow chart of a call generation sequence (slave device)

During the call reception ringing of the master device, the slave device executes a procedure similar to the call generation procedure shown in FIG. 6, except that a connection request signal is transmitted instead of the call signal and that a connection request response signal is received instead of the call response signal.

Figure 12:
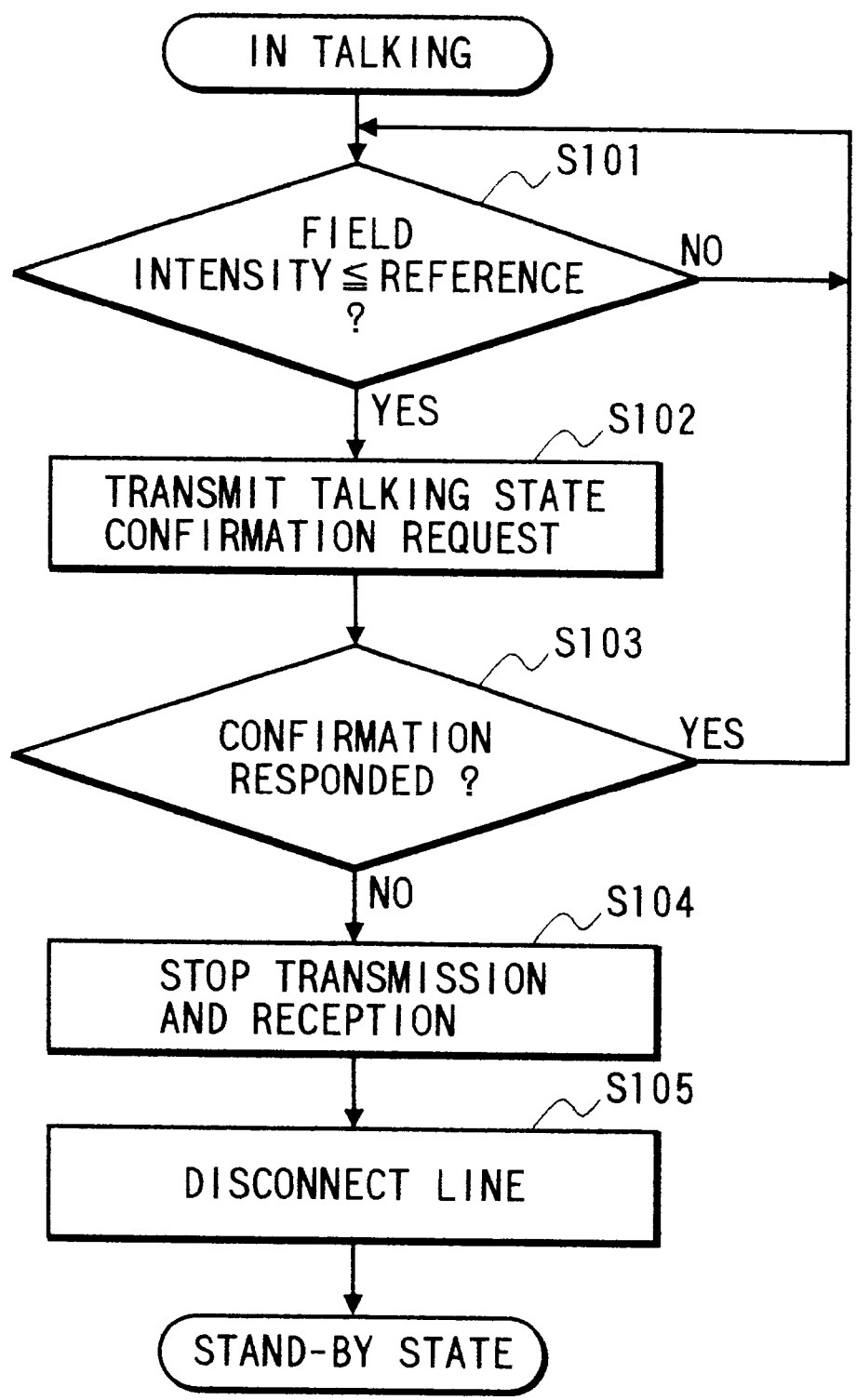
FIG. 12 is a flow chart showing the outline of a sequence for requesting communication status confirmation (master device)
Figures 13, 13A:
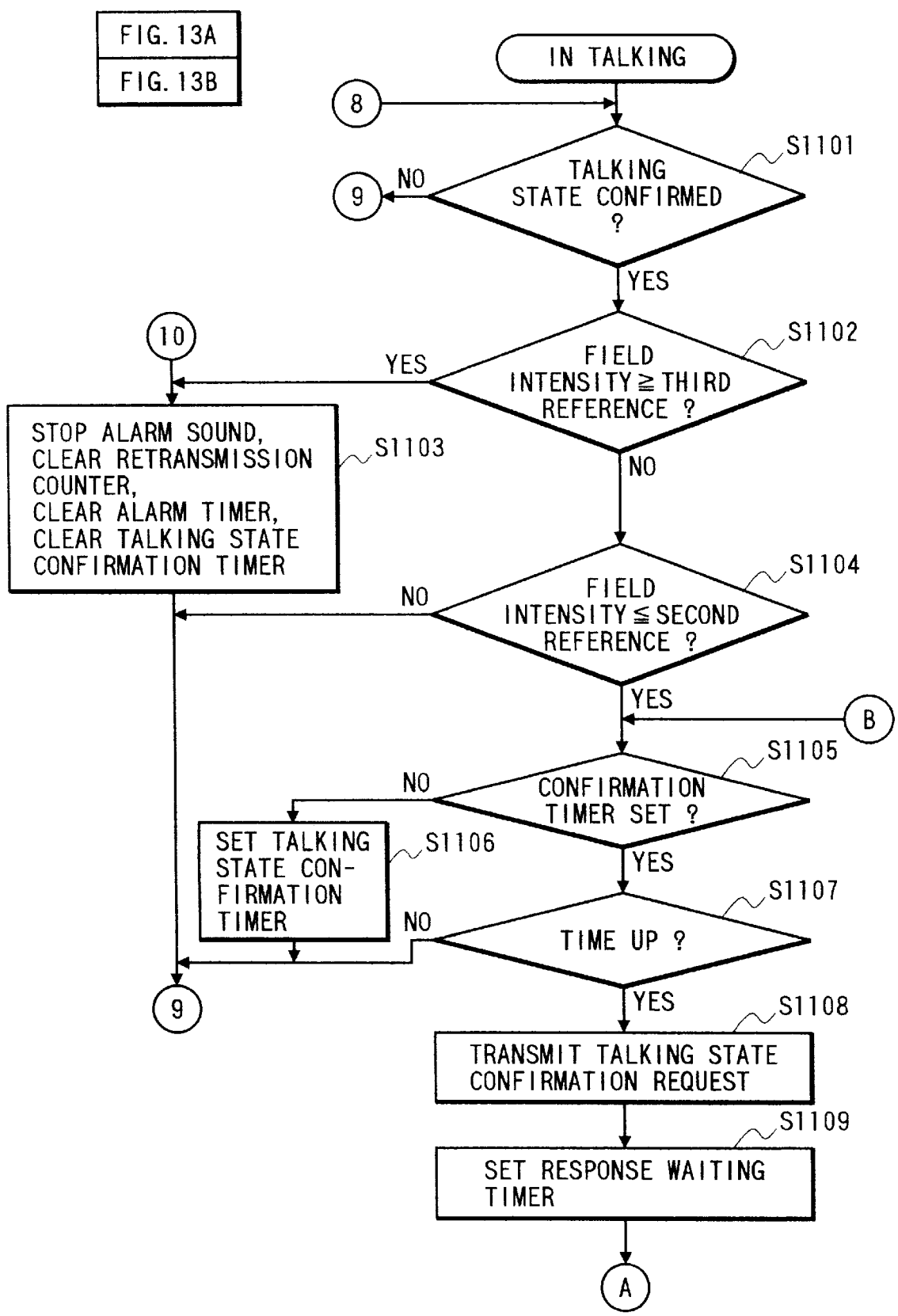
FIG. 13 which is composed of FIGS. 13A and 13B is a flow chart showing the details of the sequence for requesting communication status confirmation (master device)
Figure 13B:
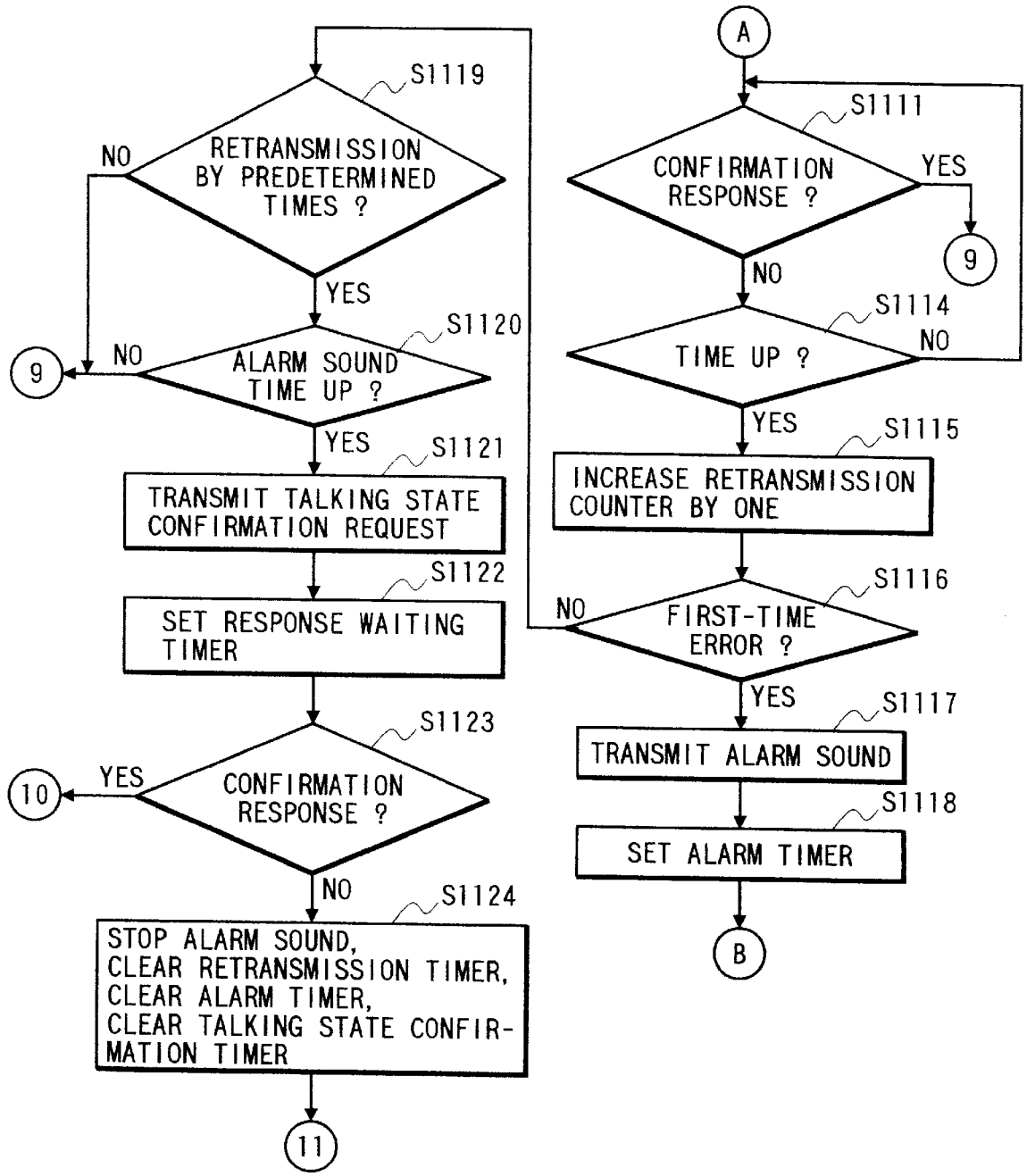
Figure 14:
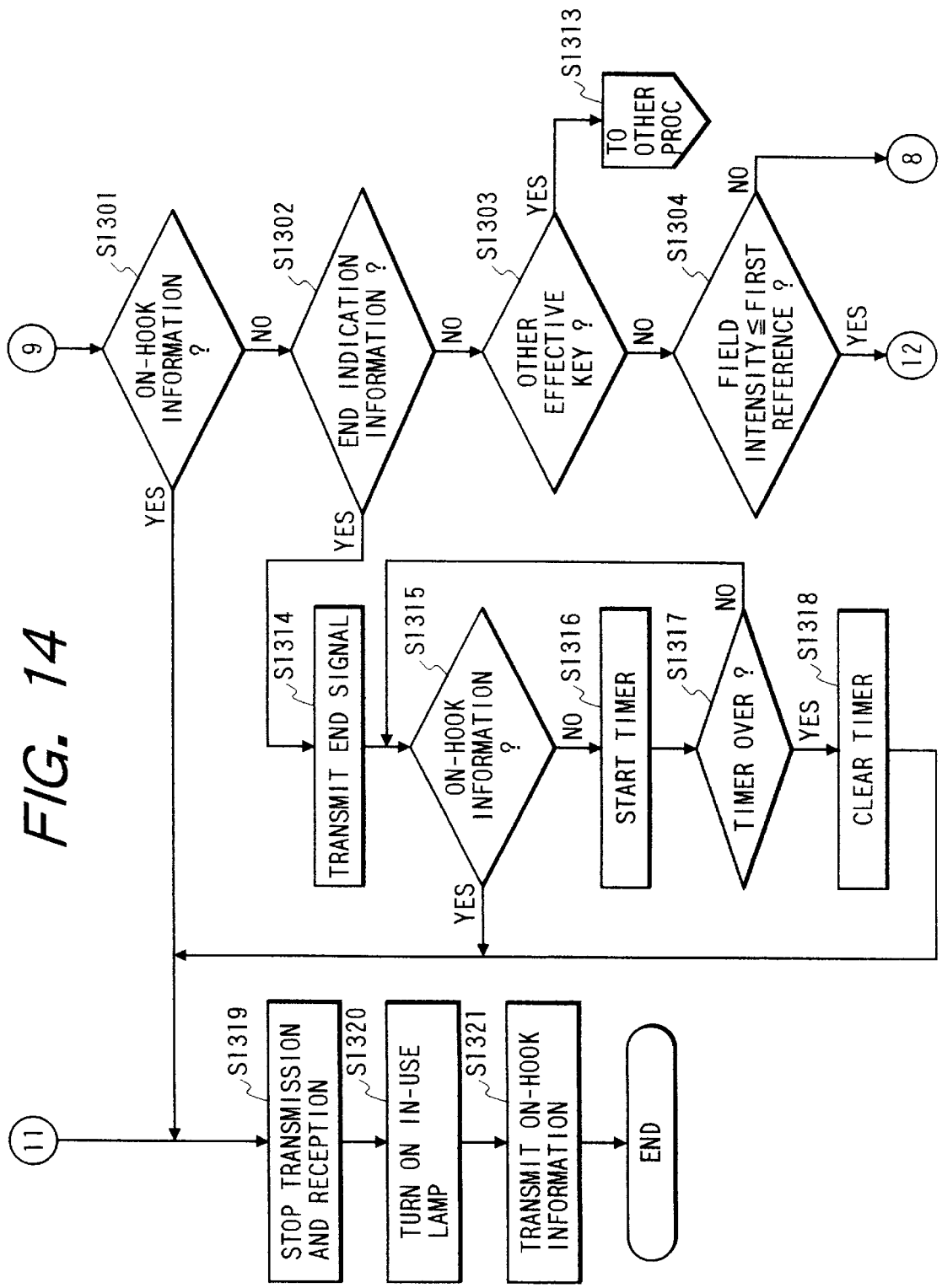
FIG. 14 is a flow chart of a call terminating sequence (master device)
Figure 15:
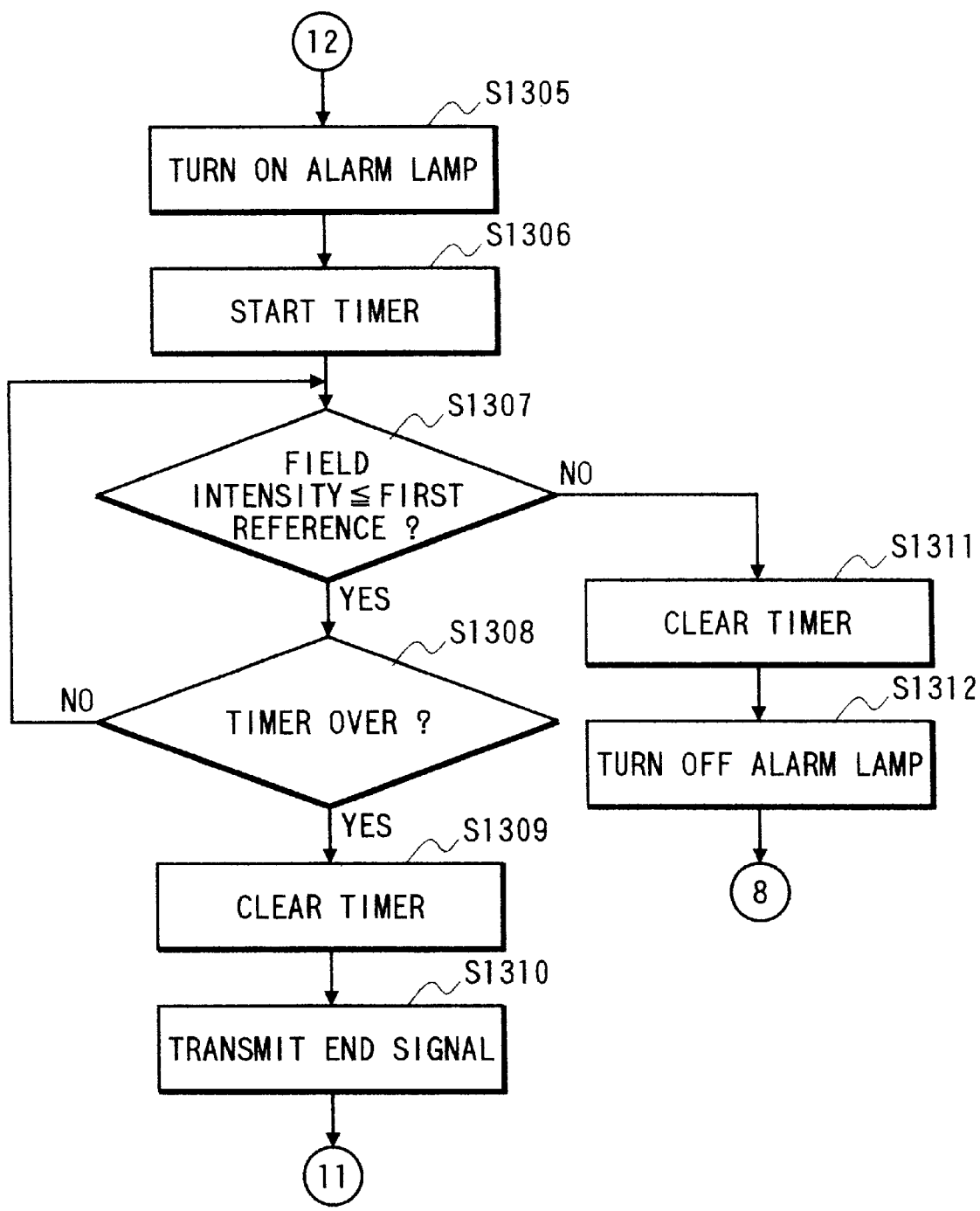
FIG. 15 is a flow chart of a carrier-off detection sequence (master device)

In the following there will be explained, with reference to FIG. 12, the outline of the procedure in the master device in case the reception field intensity drops below the reference level in the course of communication.

The CPU 210 of the master device receives the output of the detector 206 at a predetermined interval, and, upon detection that the reception field intensity has dropped below the reference level (S101), transmits a request for confirmation of the talk status through the modem 209, the voice process circuit 203, the transmission circuit 208 and the antenna 214.

Upon reception of the request for the talk status confirmation in the course of the talk, the slave device transmits a confirmation response. In a step S103, the CPU 210 of the master device receives the output of the reception circuit 207, and, if the confirmation response is received, identifies that the slave device is in communication and returns to the step S101. On the other hand, if the confirmation response is not received, the CPU 210 identifies that the slave device is not in communication but noise is received, terminates the function of the reception circuits 207, 208 (S104) and disconnects the channel with the partner of communication by controlling the line interface 202 (S105).

In the following there will be explained, with reference to FIGS. 13A to 15, the details of the procedure in the master device in the course of talk.

When the talk is started, the CPU 210 at first confirms whether the setting is so made as to request the talk status confirmation under the system set-up condition (S1101). If not, there is confirmed there has been given an instruction from the main or slave device for terminating the communication (S1301, S1302), and, in the presence of such instruction, the communication is terminated by the termination of transmission of the radio wave (S1319), but, in the absence of such instruction, the communication is continued.

If the step S1101 identifies that the setting is so set to effect the talk status confirmation, the CPU 210 reads the reception field intensity from the detector 206 and discriminates whether it has become at least equal to a level for releasing the request for the talk status confirmation, which is a third reference level determined at the system set-up (S1102). If the received field intensity is higher than the above-mentioned releasing level, the CPU 210 terminates the alarm sound and clears a confirming message resending counter, an alarm timer and a talk status confirmation timer (S1103). If the received field intensity is lower than the above-mentioned releasing level, the CPU 210 discriminates whether the field intensity has become lower than a level for starting the request for the talk status confirmation, which is a second reference level determined at the system set-up (S1104). This second reference level is smaller than the third reference level. If the received field intensity mentioned above is larger than the starting level for the talk status confirmation, there is confirmed the instruction for terminating the communication.

If the received field intensity is lower than the starting level for the request for the talk status confirmation, the CPU 210 confirms whether a timer has been set for checking the interval of talk status confirmation, set at the system set-up (S1105), and, if not set, it sets the timer (S1106), but, if set, it checks whether the timer has expired (S1107). If expired, the CPU 210 transmits a message for requesting the talk status confirmation through the wireless channel, under modulation by the modem 209, to the slave device (S1108), and sets a timer for monitoring a response signal to the requesting message (S1109). After the timer setting, there is checked whether the response is received from the slave device within the time of the timer (S1111, S1114), and, if not received within the time, it increases the count of a resending counter by one, in order to resend the requesting message (S1115). Then the CPU 210 checks whether the above-mentioned absence of response is the error of first time (S1116). If first time, the CPU 210 transmits an alarm sound from the sound source 217 to the slave device (S1117), and sets a timer for monitoring the transmission time of the alarm sound (S1118).

If it is not the first error and the alarm sound has already been transmitted, there is checked whether the resending has been conducted by a predetermined number of times (S1119), and, if not, the current reception field intensity is confirmed again for effecting the resending by the predetermined number of times. On the other hand, if the resending has been conducted for the predetermined number of times, there is checked the transmission time of the alarm sound (S1120), and, if the alarm sound transmission is to be continued, the current reception field intensity is confirmed again. If the alarm sound has been transmitted for the predetermined transmission time, the CPU 210 again transmits the message requesting the talk status confirmation to the slave device (S1121), thereby confirming the status of the slave device. It then sets the timer for awaiting the confirmation response (S1122) and checks whether the response is returned within the time of the timer (S1123). If the response is returned, the CPU 210 terminates the alarm sound and clears the confirmation message resending counter, the alarm timer and the talk status confirmation timer (S1103). Thus the transmission of the message requesting the talk status confirmation is terminated, and the communication is continued as in the satisfactory condition. If the response is not returned, the CPU, judging the absence of the carrier for a certain time (the detected carrier being not the real carrier but ambient noise), terminates the alarm sound and clears the resending counter, the alarm timer and the talk status confirmation timer (S1124) and forcedly terminates the communication (S1319).

The termination process in the master device is also executed when on-hook information is received from the slave device or when an instruction for termination is received from the main device 101 (S1301, S1302). Also the communication is disconnected when the carrier is interrupted (S1307 to S1310).

When the on-hook information is received from the slave device, the CPU terminates the transmission and the reception, then turns off the busy display and transmits the on-hook information to the main device 101 (S1301, S1319 to S1321). In case the wireless communication apparatus of the present invention is directly connected to an external line, the apparatus disconnects the external line in the step S1321. When the terminating instruction is received from the main device 101, the CPU starts a timer for monitoring whether the on-hook information is received from the slave device (S1302, S1314 to S1317). If the on-hook information is received, there is executed a procedure similar to that explained above and the sequence is terminated (S1315). If the timer expires, the timer is cleared, then there is executed a procedure similar to that in case of reception of the on-hook information and the sequence is terminated (S1317, S1318). If there is another effective key operation in the slave device, there is executed another corresponding sequence (S1313).

In the following there will be explained the procedure in the master device in case of carrier disconnection. If the reception field intensity read from the detector 206 is lower than the carrier sensing level which is a first reference level determined at the system set-up, the master device, judging that the carrier is disconnected, starts the output of alarm (S1304, S1305), and sets a timer (S1306). If the timer expires while the carrier is absent, the CPU clears the timer, then transmits a termination signal (S1307 to S1310) and executes a procedure similar to that in case of reception of the on-hook information from the master device (S1319 to S1321). If the carrier is judged present before the expiration of the timer, the CPU clears the timer, then terminates the output of the alarm display and returns to the ordinary reception (S1311, S1312).

The first reference level is smaller than the second reference level.

Figure 16B:
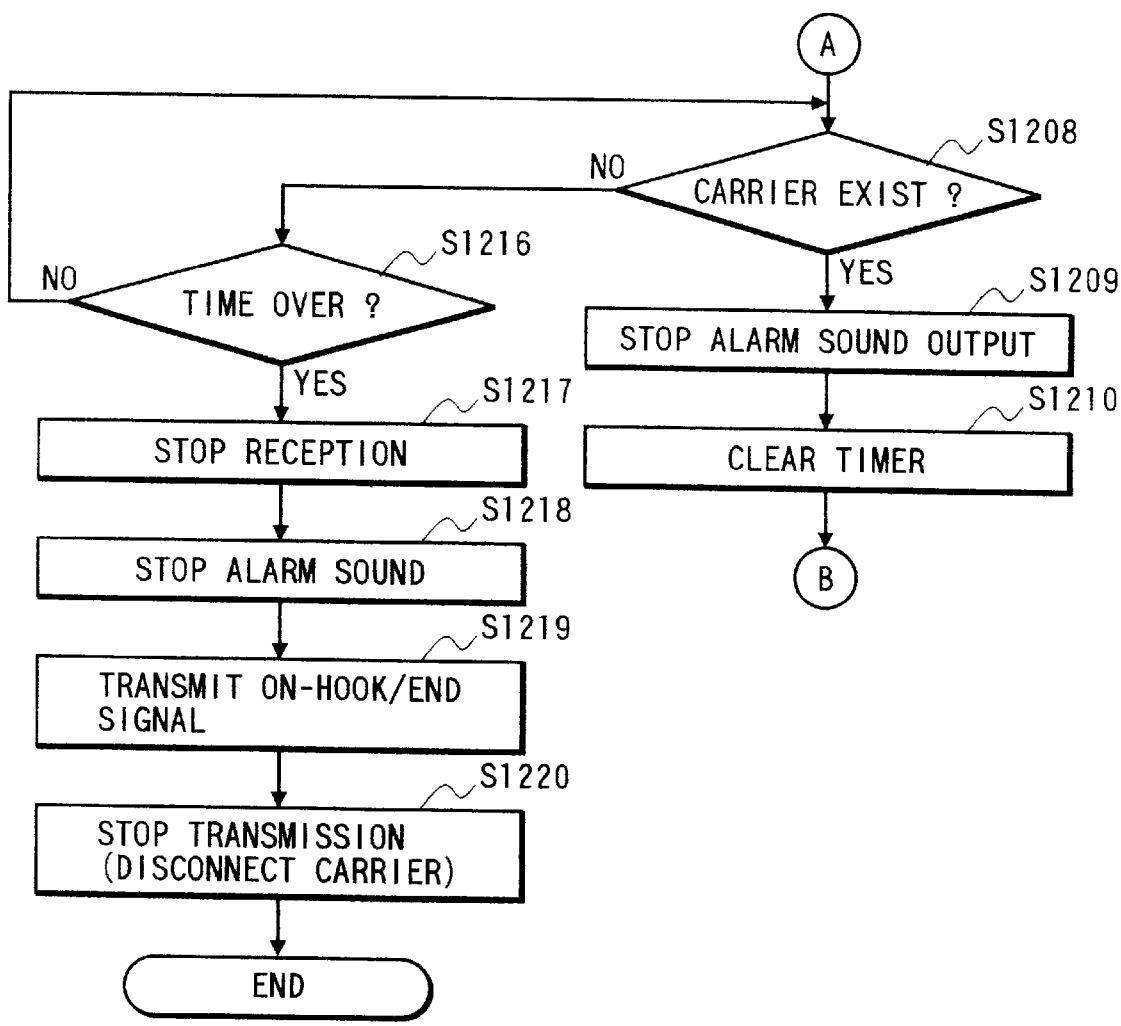
FIG. 16 which is composed of FIGS. 16A and 16B is a flow chart of a call terminating sequence (slave device).

In the following there will be explained the process of the slave device in the course of communication, with reference to FIG. 16. When the talk state is initiated, the CPU 317 of the slave device checks whether the message requesting the talk status confirmation has been received from the master device (S1401), and, if received, transmits a response (S1402). It also checks whether a request for terminating the talk has been received from the master or slave device (S1201, S1202), and, if received, it terminates the transmission of the radio wave, thereby terminating the communication (S1214).

The communication is also terminated in case the carrier is disconnected for a predetermined time (S1204, S1206 to S1208, S1216 to S1220).

More specifically, in case of the communication terminating operation or in case the terminating instruction is received from the master device, the slave device terminates the reception (S1211), then releases a talk terminating tone (S1212) and transmits an on-hook signal to the master device thereby requesting that the master device terminates the transmission carrier (S1213). Then the slave device terminates the carrier thereof (S1214). If another effective key is actuated, the sequence shifts to another corresponding procedure (S1203, S1215).

In the following there will be explained the procedure in the slave device in case of carrier disconnection. If a carrier disconnection signal is received from the detector 308 functioning as a carrier monitor unit, the slave device starts the output of alarm sound (S1204, S1206) and sets a timer (S1207). If the timer expires while the carrier is absent, it terminates the reception (S1208, S1216, S1217). It then terminates the alarm sound, transmits an on-hook signal and terminates the transmission (S1218 to S1220). If the carrier is judged present before the expiration of the timer, it terminates the output of the alarm sound, clears the timer and returns to the normal reception (S1208 to S1210).

The request for the talk status confirmation may also be made from the slave device to the master device.

The present invention has been explained by the preferred embodiments thereof, but it is not limited to such embodiments and is subject to various modifications within the scope and spirit of the appended claims.

What is claimed is:

1. A wireless communication apparatus comprising:
   connection means for connecting a selected one of a plurality of channels with a party;
   transmission means for transmitting a request for confirmation to the party connected via the selected one of the plurality of channels in the form of a wireless signal, if a reception state becomes worse than a reference state while the party is connected via the selected one of the plurality of channels; and
   decision means for deciding to continue the connection of the selected one of the plurality of channels with the party when a response to the request for confirmation is received from the party.

2. A wireless communication apparatus according to claim 1, wherein said decision means disconnects the channel if the reception electric field intensity becomes less than a predetermined value.

3. A wireless communication apparatus according to claim 1, wherein said transmission means transmits the request for confirmation at a predetermined time interval, if the reception state becomes worse than the reference state.

4. A wireless communication apparatus according to claim 3, further comprising setting means for setting said predetermined time interval.

5. A wireless communication apparatus according to claim 1, further comprising setting means for setting whether or not to transmit the request for confirmation by said transmission means.

6. A wireless communication apparatus according to claim 1, wherein said decision means disconnects the channel if a response to the request for confirmation is not received.

7. A wireless communication apparatus according to claim 1, further comprising generation means for generating an alarm sound indicating that the reception state has become worse than the reference state.

8. A wireless communication apparatus according to claim 7, wherein said transmission means resends the request for confirmation after a predetermined time from the generation of the alarm sound.

9. A wireless communication apparatus according to claim 1, wherein said transmission means repeats transmission of the request for confirmation, and interrupts transmission of the request for confirmation when the reception state becomes better than the reference state.

10. A control method for wireless communication, comprising the steps of:
    performing a wireless communication with a party;
    transmitting a request for confirmation to a party in the course of communication in the form of a wireless signal if the reception state becomes worse than a reference state in the course of communication; and
    deciding to continue the wireless communication with the party when a response to the request for confirmation is received from the party.

11. A control method for wireless communication according to claim 10, further comprising:
    a step of generating an alarm sound indicating that the reception state has become worse than the reference state; wherein the wireless communication is terminated depending on the response to the request for confirmation, after the generation of the alarm sound.

12. A master device effecting wireless communication with a slave device, comprising:
    forming means for forming a communication path to a communication partner of the slave device;

transmission means for transmitting a request for confirmation to the slave device if the reception state of the wireless signal from the slave device becomes worse than a reference state in the course of communication; and decision means for deciding to continue the communication path formed by said forming means when a response to the request for confirmation is received from the slave device.

13. A master device according to claim 12, wherein said decision means disconnects a wireless channel to the slave device according to the response to the request for confirmation.

14. A master device according to claim 12, wherein said transmission means transmits the request for confirmation based on the reception state including a reception electric field intensity.

15. A master device according to claim 12, wherein said transmission means transmits an alarm sound signal before disconnecting the communication path.

16. A wireless communication apparatus according to claim 1, wherein said transmission means transmits the request for confirmation depending on the reception state including a reception electric field intensity.

17. A control method according to claim 10, wherein the request for confirmation is transmitted based on the reception state including a reception electric field intensity.

* * * * *

UNITED STATES PATENT AND TRADEMARK OFFICE
CERTIFICATE OF CORRECTION

PATENT NO. : 5,969,629
DATED : October 19, 1999
INVENTOR(S) : Shinji Tsuchida

Page 1 of 1

It is certified that error appears in the above-identified patent and that said Letters Patent is hereby corrected as shown below:

<u>Title page,</u>
FOREIGN PATENT DOCUMENTS, please insert
-- 0310379, Europe, 09/1998
  54-75201, Japan, 06/1979 --

OTHER PUBLICATIONS, insert --
Kerr, Douglas A., "Cellular Telephone Technology and Practice," The George Washington University CEEP Course, 1608PTO, 1986, 1994, pages 2-3, 3-3, 3-4.

U.S Patent Application Serial No. 08/533,700, filed September 26, 1995
U.S Patent Application Serial No. 08/261,602, filed June 17, 1994
U.S Patent Application Serial No. 08/310,253, filed September 21, 1994
U.S Patent Application Serial No. 08/378,967, filed January 26, 1995

Signed and Sealed this

Twenty-fifth Day of December, 2001

*Attest:*

*Attesting Officer*

JAMES E. ROGAN
*Director of the United States Patent and Trademark Office*